United States Patent [19]

Byrd, Jr. et al.

[11] Patent Number: 4,553,880
[45] Date of Patent: Nov. 19, 1985

[54] HYDRA-PNEUMATIC LOAD SENSOR AND SIGNAL SYSTEM

[75] Inventors: James V. Byrd, Jr., Kingston, Tenn.; Danny K. Mints, Duncan, Okla.

[73] Assignee: Halliburton Company, Duncan, Okla.

[21] Appl. No.: 621,757

[22] Filed: Jun. 18, 1984

[51] Int. Cl.⁴ .................. B65G 53/66; G01G 5/04
[52] U.S. Cl. .................. 406/23; 73/862.52; 73/862.58; 141/83; 141/128; 177/208; 177/254; 406/28; 406/33
[58] Field of Search ............ 406/10, 28, 23–25, 406/32–33; 141/83, 128; 177/122, 208, 209, 254; 73/862.52, 862.58

[56] References Cited

U.S. PATENT DOCUMENTS 2,125,483  8/1938  Blanchard ............... 177/208 X
4,009,604  3/1977  Taber et al. ............. 177/208 X
4,219,090  8/1980  Dayton ................... 177/208

FOREIGN PATENT DOCUMENTS 30775  9/1964  German Democratic Rep. ................... 177/208

Primary Examiner—Jeffrey V. Nase
Attorney, Agent, or Firm—Joseph A. Walkowski; Thomas R. Weaver

[57] ABSTRACT

The present invention comprises a hydra-pneumatic load sensor and signal system including two stacked bellows, one filled with liquid, the other with a pressurized gas. Load on the sensor is initially supported by the gas filled bellows to a predetermined limit, above which the liquid filled bellows generates a liquid pressure signal which is used with a readout or control device.

18 Claims, 6 Drawing Figures

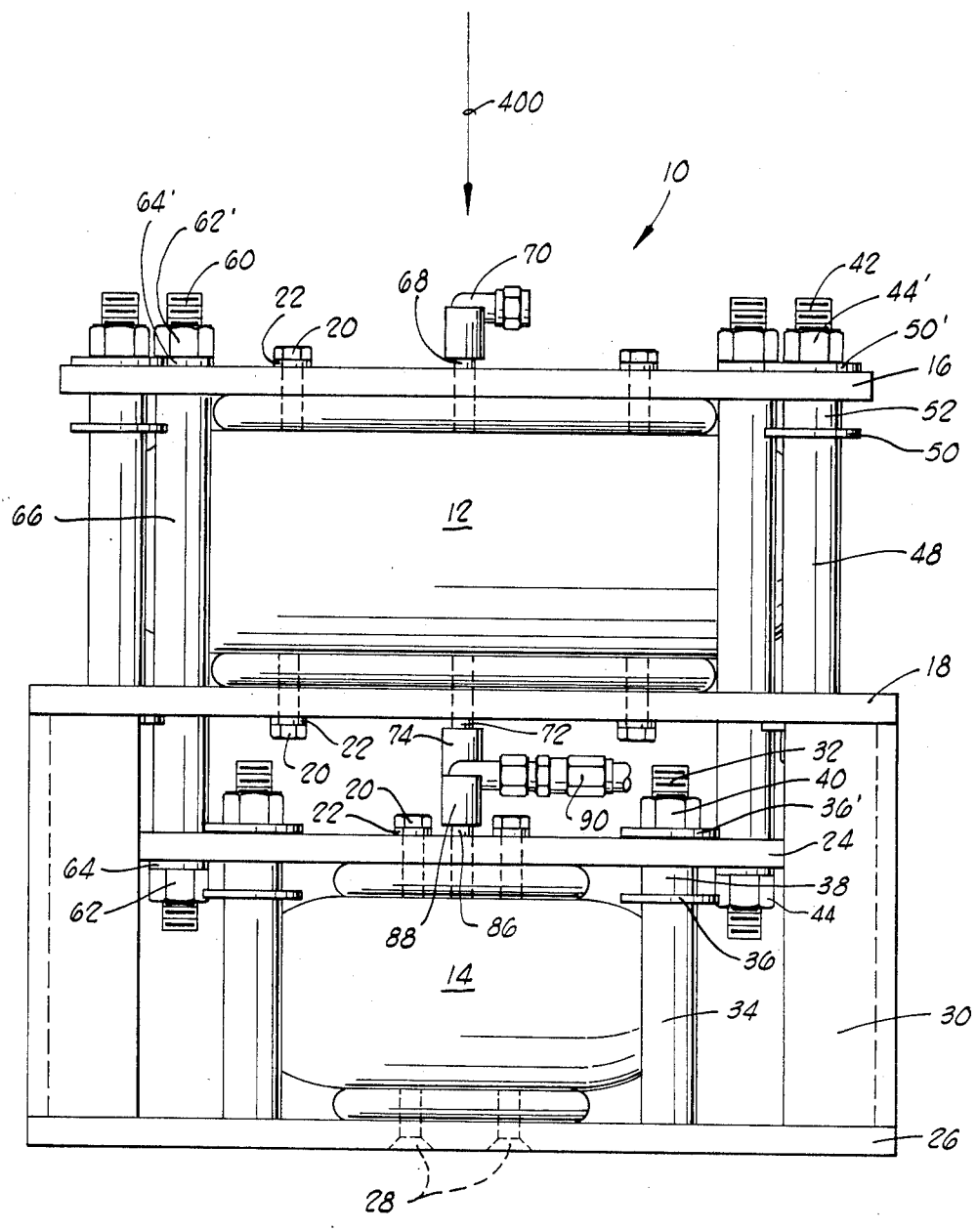

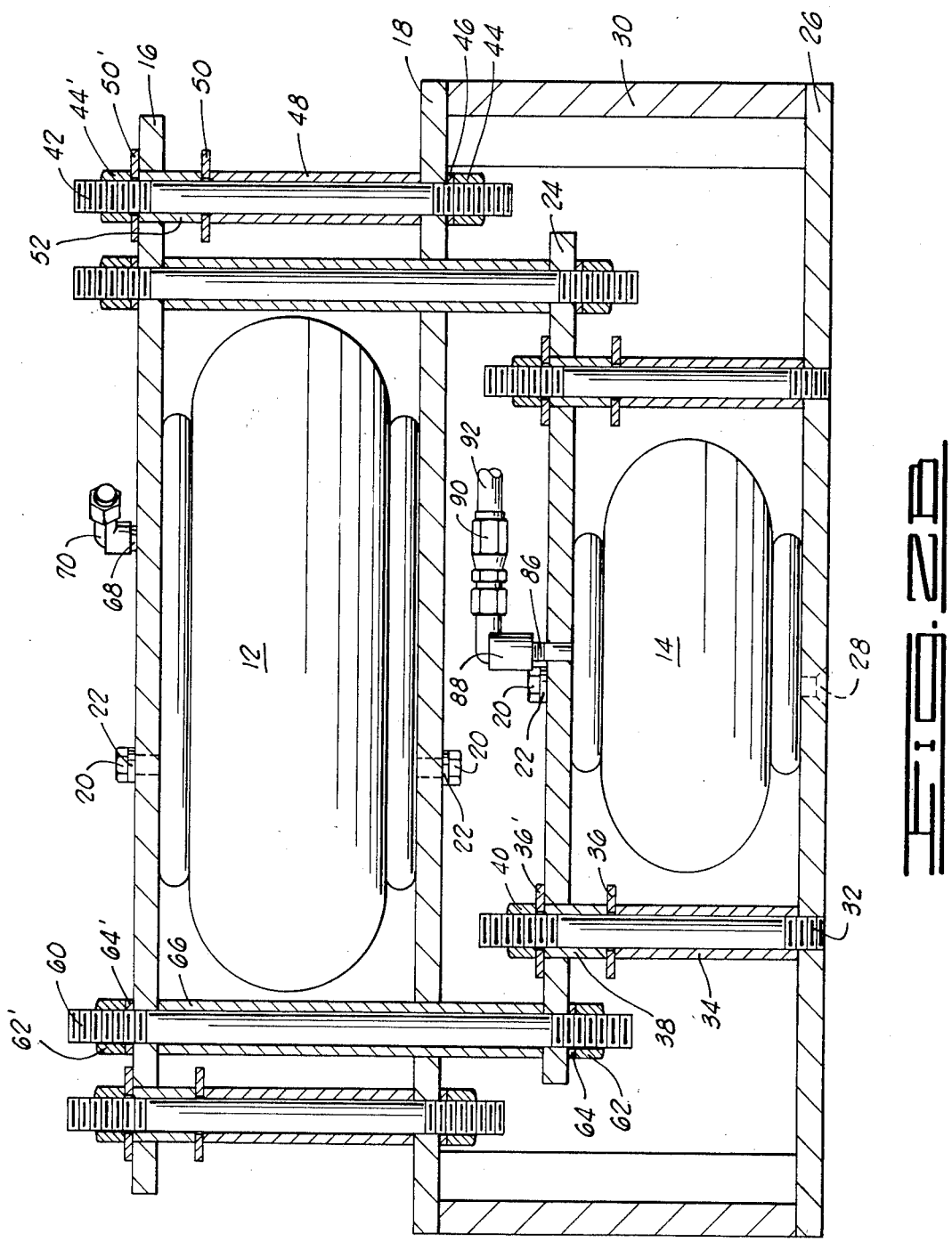

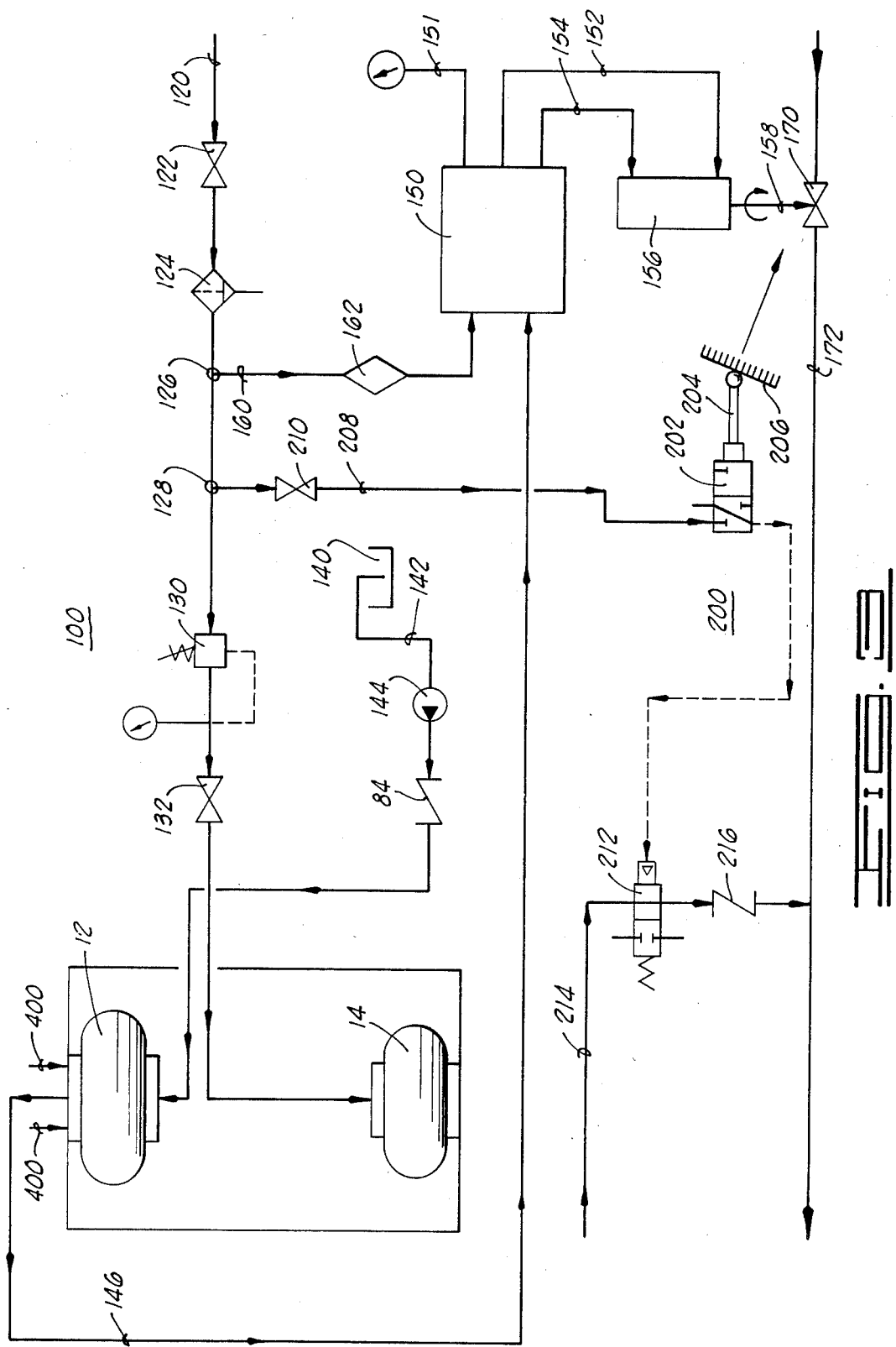

HYDRA-PNEUMATIC LOAD SENSOR AND SIGNAL SYSTEM

BACKGROUND OF THE INVENTION

Many devices are employed in industry to sense force exerted by the weight of material within a storage bin, tank or other container and to produce an output signal proportional to the force. The output signal may then be employed, through gauges or other readouts, to indicate the level, weight, or volume of material in the container. Alternatively, the output signal may be used to control the flow of material to or from the container via valves, pumps, or other means well known in the art so as to maintain a relatively constant material level, weight or volume in the container.

A significant drawback to most prior art sensing devices and control systems employed therewith is their dependence upon a relatively constant, non-fluctuating source of electrical power. In addition, electrical components and circuits are susceptible to damage and destruction from vibration, shock forces, corrosion, and temperature extremes. Such devices also require regular testing and maintenance to ensure their proper operation. Moreover, even if the sensing devices continue to operate under adverse vibration and temperature conditions, or in otherwise hostile environments, the accuracy of the generated output signal may deteriorate significantly. Finally, the use of electrically powered sensing devices and control systems is highly dangerous in the presence of flammable gases and other materials which may be ignited by electrical sparks.

While a few non-electrical load sensors using hydraulic principles are on the market, such devices are complex and relatively expensive to produce and to maintain in good working order, particularly in hostile environments. Moreover, these devices require ancillary equipment such as pressure boosters to maintain hydraulic pressure for operation. In addition, use of these prior art load sensors as control mechanisms requires the addition of a transducer to convert the hydraulic sensor signal to a pneumatic signal, as the hydraulic sensor generates a high pressure, low volume displacement signal which is unsuitable to control a valve or other mechanism without such conversion.

A major failing of the prior art has been the inability to provide an accurate, relatively trouble-free sensing device and control system which can survive in hostile environments for protracted periods of time without constant attention and maintenance. There has been a particular long-felt need for such a device in field operations of the oil and gas industry, many of which are conducted in remote areas of the world without reliable electrical power and/or on exploration and production platforms miles offshore in areas of predominantly bad weather. The use of electrically powered devices at offshore well sites in particular presents a danger so great that many well operators have instituted extremely strict design requirements which add greatly to the cost of systems employing such devices. As noted previously, while hydraulic load sensors are known in the art, they are complex, precision-manufactured devices requiring a high level of care and attention. Moreover, such sensors are not suitable as control devices without the use of additional equipment.

An additional problem with prior art load sensors has been the inability to target a specific load range and generate an accurate signal when the minimum load on the sensor is substantial.

SUMMARY OF THE PRESENT INVENTION

In contrast to the prior art, the present invention comprises a hydro-pneumatic load sensor and signal system. The load sensor includes two stacked bellows, one of which is filled with a liquid, the other of which is filled with gas at greater than ambient, substantially constant, pressure. Load on the sensor is initially supported by the gas bellows until the load limit thereof is exceeded, whereupon the liquid filled bellows is subjected to the load upon the sensor, in excess of the load supported by the gas bellows, and a liquid pressure signal is displaced to an indicator, positioner or other hydraulically actuated readout or control device. When the load is decreased, the hydraulic pressure in the liquid filled bellows decreases and the readout or control device returns to its initial position.

BRIEF DESCRIPTION OF THE DRAWINGS

The hydra-pneumatic load sensor and signal system of the present invention may be more fully understood and appreciated by one skilled in the art through a review of the following detailed description of the invention, taken in conjunction with the accompanying drawings, wherein:

FIG. 1 is a frontal elevation of a preferred embodiment of the load sensor of the present invention.

FIG. 2B is a section taken across line 2B—2B of FIG. 2A.

FIG. 3 is a schematic of a preferred embodiment of the signal system and load sensor of the present invention.

DETAILED DESCRIPTION OF THE PREFERRED EMBODIMENT OF THE LOAD SENSOR

Figure 2A:
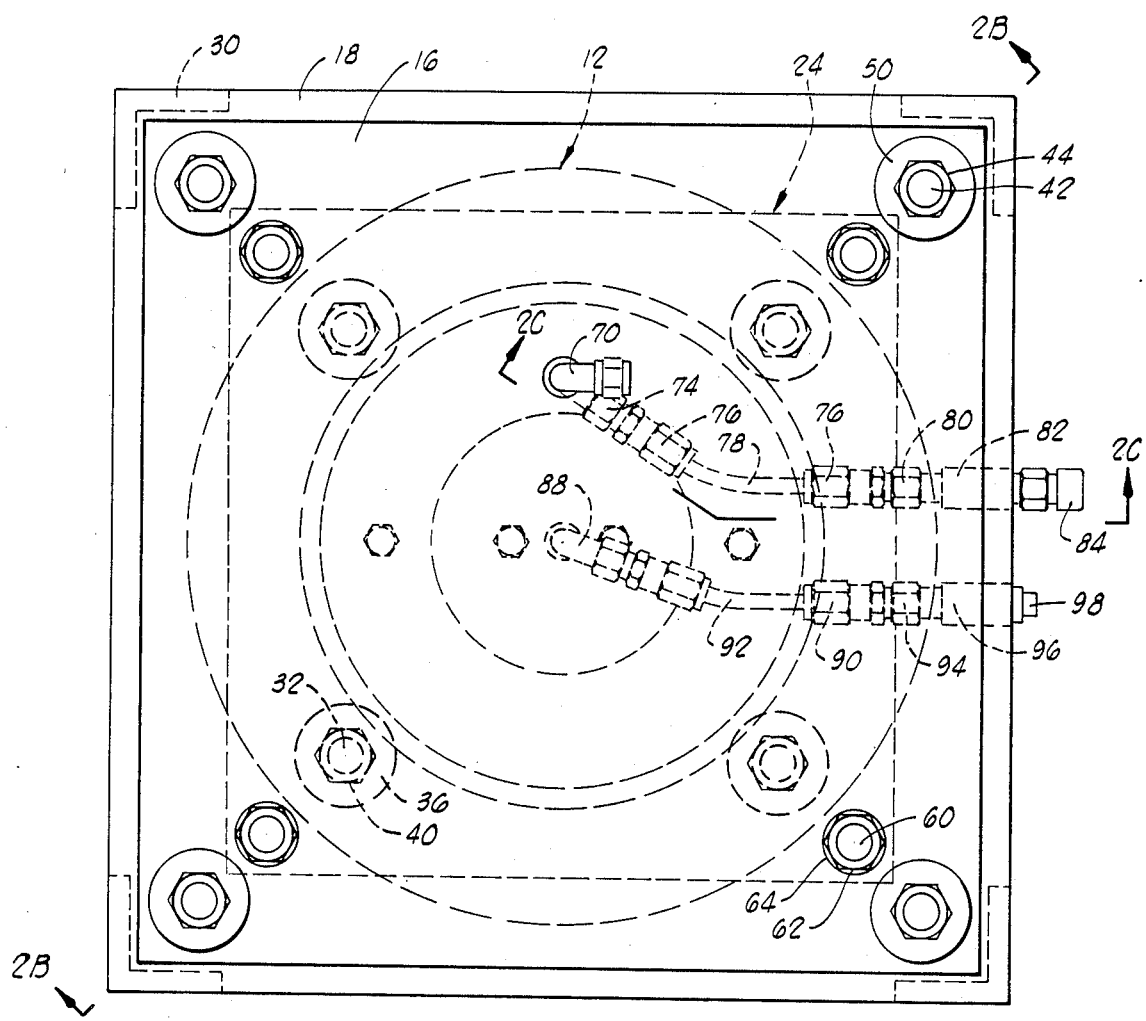
FIG. 2A is a plan view of a preferred embodiment of the load sensor of the present invention.
Figure 2C:
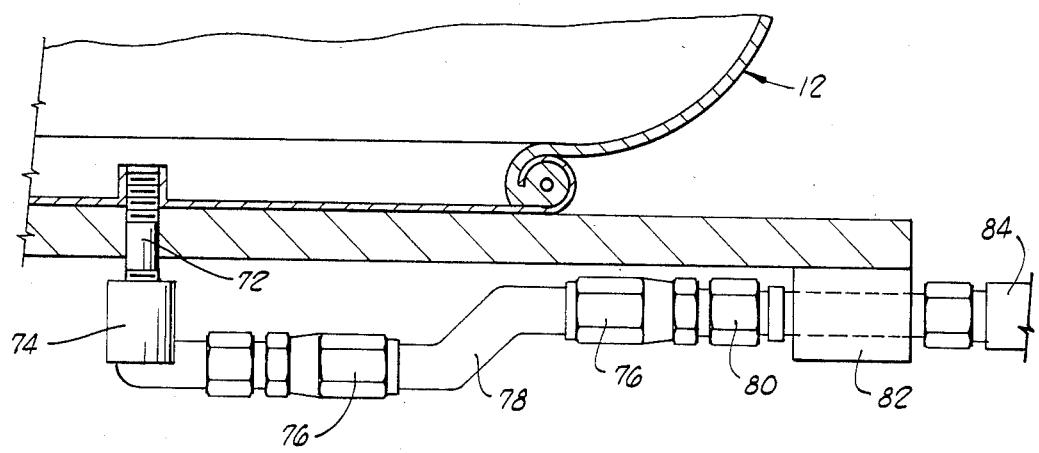
FIG. 2C is a partial enlarged section taken across line 2C—2C of FIG. 2A—2A.

Referring to FIGS. 1 and 2A through 2C, load sensor 10 comprises upper bellows 12 and lower bellows 14, which may preferably be Airmount ® Airstroke ® rubber bellows-type circular air springs, available from Firestone Tire & Rubber Company, Akron, Ohio. In the preferred embodiment as disclosed herein, upper bellows 12 is a 12.9 inch O.D. Number 19, and lower bellows 14 an 8.3 inch O.D. Number 110, Firestone airspring of the aforesaid model series.

Upper bellows 12 is secured at its top to steel upper load plate 16 and at its bottom to steel support plate 18 by a plurality of hex cap screws 20 employed with lock washers 22. In a similar fashion, lower bellows is secured at its top to steel lower load plate 24 and at its bottom to base plate 26; hex cap screws 20 and washers 22 are employed with lower load plate 24, while machine screws 28 (broken lines) are employed with base plate 26.

Support plate 18 and base plate 26 are welded at their corners to steel angle irons 30, which extend vertically therebetween. Four threaded steel rods 32 are positioned about lower bellows 14 in a substantially square pattern, and are secured in base plate 26. Steel sleeves 34 are disposed about rods 32, and washers 36 placed thereover so that rods 32 extend through washers 36. Bearing sleeves 38, which are preferably formed of polyvinyl chloride pipe, are disposed over washers 36 and extend upwardly through lower load plate 24. Additional washers 36' are placed over the tops of bearing sleeves 38, the tops of rods 32 extending therethrough. Hex nuts 40 are threaded to the tops of rods 32 and tightened over bearing sleeves 38.

Four more threaded steel rods 42 are disposed about upper bellows 12 in a substantially square pattern, and are threaded to support plate 18. Immediately below support plate 18, hex nuts 44 are threaded to the bottom of rods 42 over washers 46. Above support plate 18, steel sleeves 48 are placed over rods 42, followed by washers 50, bearing sleeves 52 similar to bearing sleeves 38, whereat rods 42 extend through upper load plate 16, and are topped by additional washers 50' and hex nuts 44', which are made up thereto.

Between each rod 32 and rod 42, looking horizontally outward from the center of load sensor 10 (see FIGS. 2A and 2B), is a rod 60, all four of which are threaded to lower load plate 24 and anchored thereto by hex nuts 62 over washers 64. Steel sleeves 66 extend over rods 60 from the top of lower load plate 24 to the bottom of upper load plate 16 through support plate 18, to which sleeves 66 are not connected. Rods 60, which extend through upper load plate 16, are topped by hex nuts 62' over washers 64'.

Nipple 68 extends through upper load plate 16 and communicates with the interior of upper bellows. Nipple 68 is connected to elbow hose adapter 70. In a similar fashion (see FIG. 2C) nipple 72 extends downward through support plate 18 and has elbow hose adapter 74 connected thereto, followed by hose fitting 76, hydraulic hose 78, another hose fitting 76, straight hose adapter 80, which extends to coupling 82. At the end of coupling 82 is check valve 84, which permits flow into upper bellows 12, but prevents backflow therefrom.

Lower bellows 14 is in communication with elbow hose adapter 88 through nipple 86, hose adapter 88 being connected to hydraulic hose 92 having hose fittings 90 at each end thereof, the outermost of fittings 90 being connected to straight hose adapter 94 extending to coupling 96. At the outer end of coupling 96 is pipe plug 98, which is removed when load sensor 10 is operated, as will be explained hereafter.

In operation, upper bellows 12 is filled with a liquid, preferably a 50% water - 50% ethylene glycol mixture, while lower bellows 14 is filled with a gas, preferably air, under pressure. The use of oil-base liquids in upper bellows 12 is not recommended as such will cause deterioration in the rubber of the bellows.

DETAILED DESCRIPTION OF A PREFERRED EMBODIMENT OF THE SIGNAL SYSTEM

Referring to FIG. 3 of the drawings signal system 100 incorporating load sensor 10 is schematically depicted at the upper left-hand corner. Upper bellows 12 and lower bellows 14 are shown in their relative positions but without the accompanying supporting structure described in detail with respect to FIGS. 1 and 2.

Arrow 120 represents a source of pressurized gas, which may preferably be an air line carrying compressed air such as is generally available on a rig at a well site, typically 120 psig. Air line 120 is routed through ball valve 122 to an air filter 124 adapted to remove contaminants, including water, from the air. The air line splits at tee 126, with the upper branch leading to a second tee 128, then to a self-relieving pressure regulator 130 which may typically be settable at a range between 0 and 120 psig. From regulator 130, air line 120 proceeds through a second ball valve 132 to lower bellows 14.

Item 140 is a schematically depicted liquid reservoir, such as a bucket, from which a 50-50 water-ethylene glycol mixture is introduced via inlet line 142 into the bottom of upper bellows 12 through a hand pump 144, such as a Martin-Decker HYDRA hand pump, and through check valve 84, which prevents backflow from bellows 12. Signal line 146 extends from the top of upper bellows 12 to positioner 150.

It should be noted that variations in temperature causing expansion of the liquid in upper bellows 12 is compensated for by the nature of the system. For example, when upper bellows 12 is filled with liquid, all of the air is bled out of bellows 12 and signal line 146. Lower bellows 14 is then pressured up to support any load imposed on the load sensor 10. The gas pressure in lower bellows 14 is then bled off until a one to two psig pressure signal is generated in upper bellows 12, after which the signal line 146 is bled to zero psig signal. At this point there is a slight excess volume in upper bellows 12, which is available to compensate for expansion of the liquid therein under temperature increases. Expansion of upper bellows 12 during operation due to increases in temperature in the liquid therein is additionally compensated for somewhat by the elasticity of the rubber of the bellows.

Operating air line 160 extends to positioner 150 from tee 126 via micro-filter 162, which substantially removes any remaining contaminants from the pressurized air.

Positioner 150 is thus provided with two sources of pressurized fluid, air from line 160, and liquid from signal line 146 connected to upper bellows 12. As noted previously, the pressurized air source may be at 120 psig; the liquid signal from bellows 12 will typically vary from between 3 to 15 psig, as will be explained hereafter. Air line 160 provided a source of power to operate valve 170 in materials flow line 172, while liquid line 146 provides a control signal to direct the pressurized air by which valve 170 is opened or closed.

Briefly, as such devices are well known in the art, the positioner of the positioner/actuator combination controls the relative output of control lines 152 and 154 to double acting actuator 156, which through shaft 158 rotates valve 170 through an arc of 90° between full open and full closed in response to the pressure carried by signal line 146. A positioner which may be employed with system 160 as disclosed is the Pneupowr Positioner, produced by Raymond Control Systems of St. Charles, Ill., with which may be employed a Pneupowr Type AA rotary actuator produced by the same manufacturer. Alternatively, a Keystone Type 'A' positioner may be employed with a Dynamate F-790 actuator, both of the aforesaid items being produced by Keystone Valve U.S.A. of Houston, Tex. A readout 151 is also shown schematically, which readout may be of any type known in the art and calibrated to indicate force, mass, weight, level, volume, or other parameter correlated to the load placed upon load sensor 10. Such a readout, of course, may be used in lieu of positioner 150, actuator 156 and valve 170 if information relating to the load on load sensor 10 is all that is desired. Alternatively, readout 151 may be omitted if all that is desired is a control signal to operator valve 170. Moreover, a pump, compressor or other control means may be substituted for valve 170 and operated by actuator 156.

System 100 as shown is intended for the control of flow of aerated powdered dry material (such as cement) under low (typically 45 psig) pressure. Line 172 may typically be a five inch O.D. line running from a metered source to a tank, mixer or other receiving vessel and valve 170 may be a butterfly-type valve having a rotatable flapper therein mounted on a shaft perpendicular to the material flow. In such flow systems, the presence of valve 170 will tend to cause a buildup of material in flow line 172 whenever the flap in valve 170 is only partially open, due to the decrease in air velocity in the line, which permits the aerated material to settle out. In order to reduce line clogging, a purge system 200 may be added to signal system 100.

Purge system 200 comprises a cam operated poppet valve 202 which is operated responsive to the contact of follower 204 against cam 206, which is preferably placed on the rotatable shaft 158 leading from actuator 156 to valve 170. The configuration of cam 206 is such that there will be a raised area which will act against cam follower 204 when valve 170 is in a partially open position, for example from 5° to 30° on a rotational basis, with 0° arc corresponding to a valve closed position and 90° corresponding to a full open valve position, with the butterfly parallel to the flow stream. When cam operated poppet valve 202 is opened by follower 204, air from tee 128 will be permitted to flow through purge control line 208 ball valve 210 and poppet valve 202 to two-way valve 212 which is placed across purge air line 214, which carries air at substantially the same pressure (45 psig) as material flow line 172. When control air reaches two-way valve 212, the latter opens in response thereto and releases purge air into flow line 172 through check valve 216. Check valve 216, of course, prevents back flow of aerated cement from flow line 172 into purge air line 214 and valve 212 when valve 212 is closed or closing.

OPERATION OF THE LOAD SENSOR AND SIGNAL SYSTEM

Figure 4:
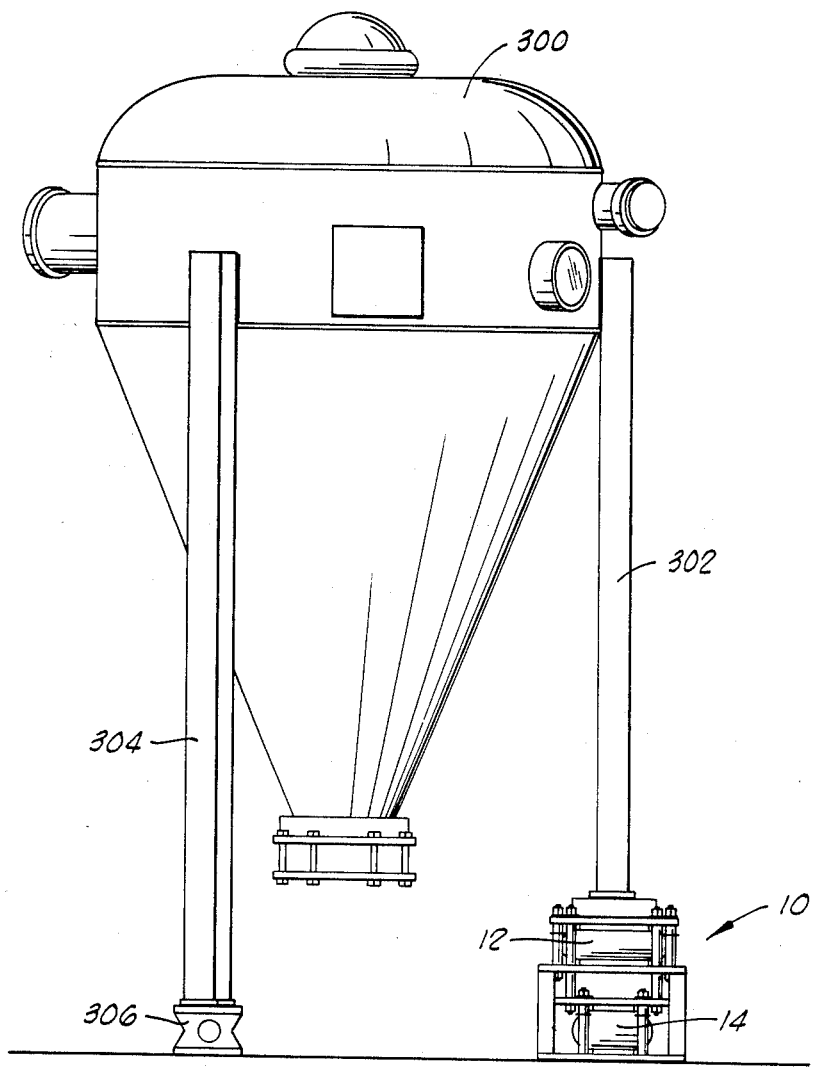
FIG. 4 is an elevation of a bulk materials tank having one of its legs supported on a load sensor of the present invention.

Referring to FIGS. 1, 3 and 4, operation of the load sensor 10 in signal system 100 is hereafter described. FIG. 4 depicts a bulk materials tank 300 of the type employed to feed dry cement on a rig or offshore platform to a mixing system used to mix cement to be injected in the annulus between well casing and the wall of a well bore to provide structural support for casing, to prevent fluid migration between formations, to prevent contamination of ground water, and for other reasons well known in the art. A mixing system commonly employed for such an operation is the RCM ® system, manufactured by Halliburton Services, Duncan, Okla. Dry cement is fed into tank 300 by a materials flow line 172, and is removed therefrom by another line (not shown) leading to the aforesaid mixing system. It is desirable to maintain tank 300 in at least a partially filled state at all times during the cementing operation, so that the mixing system fed by tank 300 will be able to operate continuously. In order to achieve this result, one of the legs 302 supporting tank 300 is placed on load sensor 10, while the other two legs (304 and another not shown), rest on a stable supporting surface such as the rig or platform floor, to which they are secured via pivots 306.

To operate signal system 100, it is first determined what volume or level of dry cement is desired to be maintained in tank 300. Assuming tank 300 is an 80 cubic foot tank, a volume of 60 cubic feet may be employed as the target maximum volume to prevent clogging at the top, or inlet, end of the tank. Since the aerated cement density may vary from about 67 lb/cu.ft. to about 92 lb/cu.ft., and the empty tank alone weighs 2280 lb, the maximum load of the tank filled with 60 cu.ft. of cement may range from about 6300 lb to 7800 lb, with the load equally split between the three legs of tank 300. The designed control signal will range from 3-15 psig, with 15 psig occurring when tank 300 is at its 60 cu.ft. filled level. Steady state level during operations will be about 40 cubic feet.

Lower bellows 14, filled with pressurized gas, provides an adjustment factor for system 100. The lower bellows 14 will carry the leg load of the empty tank (760 lb) plus a desired portion of the material weight in the tank. The load limit of the lower bellows 14 is dependent upon the air pressure therein, which may be adjusted by pressure regulator 130 to accommodate the weight of empty tank 300 plus a partial load of cement of greater (92 lb/cu.ft.) or lesser (67 lb/cu.ft.) density or some density therebetween. When the set load limit of lower bellows 14 is exceeded, air is vented to the atmosphere through regulator 130 to maintain constant pressure in lower bellows 14, and load in excess of this set load limit will be supported by upper bellows 12.

This transfer of load from lower to upper bellows can most easiy be seen with reference to FIG. 1. When a load 400 is placed on upper load plate 16, the force is transmitted via sleeve 66 to lower load plate 18, which in turn is supported by lower bellows 14 and base plate 26. As load 400 increases and the load limit of lower bellows 14 is exceeded, any increase in internal bellows pressure resulting from the load increase being vented to the atmosphere pressure regulator 130. As the load limit of lower bellows 14 is exceeded, the excess load is supported by upper bellows 12, which contains the control liquid for signal system 100. The excess load thus generates an hydraulic pressure control signal in signal line 146 which will vary in proportion to the load.

In operation, when cement is initially flowing in line 172 to tank 300, lower bellows will support the load of the empty tank and positioner 150 will be directing air pressure from operating air line 160 through actuator control line 152 to maintain shaft 158 of actuator 156 in a substantially fully open or 90° phase, holding the flap of valve 170 in a position parallel to the direction of flow in line 172. As tank 300 begins to fill, at some point (predetermined by the air pressure level in lower bellows 14) the load limit of lower bellows 14 will be exceeded, and the excess load on upper bellows 12 will generate an initial hydraulic pressure control signal of, for example, 3 psig in upper bellows 12 which signal is carried by signal line 146 to positioner 150. In response to this signal, positioner 150 will modulate the air pressure from line 160 so as to direct air pressure through actuator control line 154 to commence the rotation of actuator shaft 158 toward a 0° or substantially fully closed phase, with the flap of valve 170 in a substantially closed position substantially perpendicular to the flow in line 172. As the load in tank 300 reaches its desired maximum, the pressure signal in liquid control line 146 will approach a maximum of about, for example, 15 psig.

When the control signal in line 146 reaches a predetermined level, for example 12 psig, flow velocity in line 172 will be significantly reduced due to the throttling effect of the partially closed flap in valve 170. This reduction in velocity precipitates the settling of the aerated material in line 172, which settling might cause line clogging or prevent full closure of valve 170. However, when the control signal reaches such a pressure, shaft 158 of actuator 156 will have rotated a sufficient degree so that the raised cam surface 206 thereon will have contacted follower 204 on poppet valve 202 of purge system 200. As poppet valve 202 is opened by follower 204, air from purge air line 214 will be admitted to flow line 172 downstream of valve 170 through the opening of two-way valve 212 in response to the pressure in purge control line 208. The resulting blast of air will provide additional velocity to the aerated material in flow line 172 and inhibit settling until valve 170 is substantially closed. In a similar fashion, when sufficient material has left tank 300 to lower the load 400 and the pressure signal in signal line 146 below 15 psig, actuator 156 will commence the rotation of shaft 158, cracking open valve 170 and causing contact of cam 206 and follower 204, initiating another blast of purge air into flow line 172. Since there will be a time lag in the transmission of aerated material via line 172 to tank 300 once valve 170 is opened, the pressure in signal line 146 will continue to decrease, tank 300 being initially emptied at a faster rate than line 172 can fill it with valve 170 only partially open. This continued pressure signal decrease will result in the full opening of valve 170, which will allow line 172 to commence filling tank 300 at a faster rate than it is being emptied, until the pressure signal in line 146 reaches 15 psig, shutting off flow line 172 again at valve 170.

While FIG. 3 depicts purge air line 214 downstream from valve 170 in conjunction with the detailed description of the invention, it should be noted that placement of the purge air line 214 is not so limited. For example, if valve 170 is placed relatively far from the source of material to be transported, purge line 214 would be more preferably placed upstream of valve 170 so as to propel the aerated material toward its destination. In addition, more than one purge air line 214 may be placed on line 172, particularly if line 172 is extremely long, to keep the aerated material flowing therein and to prevent line and valve clogging. Such additional lines may each have their own two-way valve 212, or several purge lines 214 may feed off of a single valve 212.

It will be understood that readout 151 may be provided to give an instantaneous reading of the material mass, weight, level or volume in tank 300, such reading not being susceptible to time lags as it is generated directly from the pressure signal in signal line 146. Of course, if desired, readout 151 may be omitted, or positioner 150 and actuator 156 omitted and valve 170 operated manually in response to an operator observing fluctuations in data from readout 151.

Thus it is evident that a novel and unobvious load sensor and signal system has been invented. Additions, deletions and modifications to the preferred embodiment as disclosed will be apparent to one of ordinary skill in the art. For example, the positions of the gas and liquid filled bellows might be reversed, and the liquid filled bellows placed on the bottom of the load sensor; less or more than four supporting rods per set in each or all sets of rods 32, 42 and 60 might be employed in load sensor 10; bellows 12 and 14 might comprise piston in cylinder type chambers in lieu of flexible rubber bellows; an accumulator might be employed in conjunction with the liquid filled bellows to compensate for extreme temperature variations, or if the bellows construction employed does not adequately compensate for variations in temperature as does the preferred embodiment; other structural materials may be substituted for those described; the liquid filled bellows might be filled in a different manner than described; the gas filled bellows 14 could have an independent pressurized gas supply from a tank or compressor; the two-way valve 212 of purge system 200 might be directly controlled by follower 204, eliminating poppet valve 202 and purge control line 208; valve 170 might be a ball valve, plug valve, other type valve or a pump or other impeller; flow line 172 could be a liquid flow line, a screw-operated material feed line, a conveyor belt, or other material transport means known in the art; air from line 160 could be employed to drive a pump or other material impeller under control of positioner 150; purge system 200 could be operated directly in response to signal pressure of a given range in line 146 and the cam/follower combination deleted; the load sensor 10 may be employed in other than a vertical load-sensing position. These and other changes may be made to the preferred embodiment without departing from the spirit and scope of the invention as claimed:

We claim:

1. A load sensor, comprising:
   first bellows means substantially filled with a substantially compressible fluid under a selected pressure having first load plate means associated therewith;
   second bellows means filled with a substantially incompressible fluid having second load plate means associated therewith;
   signal line means in communication with said second bellows means; and
   load transfer means connecting said first and second load plate means wherein said load is supported by said first bellows means when said load sensor is subjected to a said load of less than or equal to the support provided by said first bellows means filled with said compressible fluid at said selected pressure and wherein said load is supported by said second bellows means when said load sensor is subjected to a said load greater than the support provided by said first bellows means filled with said compressible fluid at said selected pressure.

2. The apparatus of claim 1, further including first and second support means adapted to respectively support said first and second bellows means.

3. The apparatus of claim 2, wherein said first and second support means are maintained in a fixed spatial relationship by stanchion means extending therebetween.

4. The apparatus of claim 3, wherein said first and second load plate means are maintained in a fixed spatial relationship by said load transfer means.

5. The apparatus of claim 4, wherein said bellows means comprise rubber bellows; said load plate means comprise substantially rigid plates; and said load transfer means comprises a plurality of rods secured to said first and second plates.

6. The apparatus of claim 1, wherein said second bellows generates an hydraulic signal substantially proportional to said load when said load is supported by said second bellows.

7. The apparatus of claim 6, further including first alignment means extending between one of said support means and one of said load plate means, and second alignment means extending between the other of said support means and the other of said load plate means.

8. A load-sensing signal system, comprising:
first bellows means;
second bellows means;
a substantially compressible fluid at a selected pressure in said first bellows means;
a substantially incompressible fluid in said second bellows means;
said first bellows means and said second bellows means being arranged such that said load is supported by said first bellows means until the magnitude of said load exceeds the support provided by said first bellows means, whereafter said load is supported by said second bellows means;
signal line means in communication with said second of said bellows means; and
signal output means in communication with said signal line means.

9. The apparatus of claim 8, wherein said signal output means comprises a readout means.

10. The apparatus of claim 9, wherein said signal output means comprises a control means.

11. The apparatus of claim 10, wherein said control means comprises:
positioner means in communication with said signal line means and with a nonelectric power source; and
actuator means adapted to change a control element between at least a first and a second position in response to selective application of said power source by said positioner means in response to a signal in said signal line means.

12. The apparatus of claim 11, further including flow line means carrying therein a flow of material controlled by said control element thereon.

13. The apparatus of claim 12, wherein said material is a pressurized aerated particulate material, and said control element is a valve.

14. The apparatus of claim 13, further including purge means downstream of said valve on said flow line means.

15. The appartus of claim 14, wherein said purge means includes:
a source of purge fluid at substantially the same pressure as the pressure in said flow line means;
purge valve means disposed between said purge fluid source and said flow line means; and
purge control means adapted to open said purge valve means and admit purge fluid into said flow line means in at least one position of said control element.

16. The apparatus of claim 15, wherein said purge control means comprises a cam associated with said control element and a follower associated with said purge valve means.

17. A method of measuring a load above a predetermined magnitude, comprising:
supporting said load with a first bellows means filled with a substantially compressible fluid until said load exceeds said predetermined magnitude;
transferring said load above said predetermined magnitude to a second bellows means filled with a substantially incompressible fluid; and
generating an output signal from said second bellows means substantially in proportion to said load above said predetermined magnitude.

18. The method of claim 17, further including the steps of:
maintaining said first fluid in said first bellows means at a substantially constant pressure.

* * * * *